(12) United States Patent
Unno et al.

(10) Patent No.: US 12,172,663 B2
(45) Date of Patent: Dec. 24, 2024

(54) WARNING DEVICE UTILIZING AZIMUTH ANGLES OF VEHICLES

(71) Applicant: ISUZU MOTORS LIMITED, Tokyo (JP)

(72) Inventors: Masahide Unno, Fujisawa (JP); Masafumi Kubota, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 36 days.

(21) Appl. No.: 18/041,826

(22) PCT Filed: Aug. 23, 2021

(86) PCT No.: PCT/JP2021/030847
§ 371 (c)(1),
(2) Date: Feb. 16, 2023

(87) PCT Pub. No.: WO2022/045076
PCT Pub. Date: Mar. 3, 2022

(65) Prior Publication Data
US 2023/0322250 A1  Oct. 12, 2023

(30) Foreign Application Priority Data

Aug. 24, 2020 (JP) ................................. 2020-141157

(51) Int. Cl.
*G08B 21/00* (2006.01)
*B60W 30/095* (2012.01)
*B60W 50/14* (2020.01)

(52) U.S. Cl.
CPC ........ *B60W 50/14* (2013.01); *B60W 30/0956* (2013.01); *B60W 2050/143* (2013.01); *B60W 2554/80* (2020.02); *B60W 2556/65* (2020.02)

(58) Field of Classification Search
CPC ............. B60W 50/14; B60W 30/0956; B60W 2050/143; B60W 2554/80; B60W 2556/65; G08G 1/167; G08G 1/16; G08G 1/163

(Continued)

(56) References Cited

U.S. PATENT DOCUMENTS

| 2007/0282530 A1* | 12/2007 | Meister ................... G08G 1/165 |
| | | 340/686.6 |
| 2014/0145861 A1* | 5/2014 | Goudy ................... G08G 1/163 |
| | | 340/905 |

(Continued)

FOREIGN PATENT DOCUMENTS

| CN | 104221066 A | 12/2014 |
| CN | 105513420 A | 4/2016 |

(Continued)

OTHER PUBLICATIONS

International Search Report of PCT/JP2021/030847 dated Oct. 12, 2021.

*Primary Examiner* — Mark S Rushing
(74) *Attorney, Agent, or Firm* — Shih IP Law Group, PLLC

(57) ABSTRACT

A warning device includes: an other vehicle approach determining part that determines that another vehicle is approaching a subject vehicle from a side of the subject vehicle A, if a subject vehicle travel vector and an other vehicle travel vector intersect with each other, and if the position of the other vehicle is included in a predetermined angle range defined laterally with respect to an azimuth angle of the subject vehicle A while it is determined that the subject vehicle A during traveling is in a temporary stop state, where its vehicle speed is equal to or less than a predetermined vehicle speed; and an output control part that causes a warning output part to output a warning on condition that the (Continued)

subject vehicle A in the temporary stop state starts travelling while the other vehicle is approaching the subject vehicle A.

8 Claims, 6 Drawing Sheets

(58) Field of Classification Search
USPC .................................................. 340/425.5
See application file for complete search history.

(56) References Cited

U.S. PATENT DOCUMENTS

| | | | |
|---|---|---|---|
| 2015/0032362 A1 | 1/2015 | Goudy et al. | |
| 2015/0046038 A1 | 2/2015 | Kawamata et al. | |
| 2016/0101731 A1 | 4/2016 | Matsuoka et al. | |
| 2016/0185348 A1 | 6/2016 | Miura et al. | |
| 2016/0335897 A1 | 11/2016 | Naserian et al. | |
| 2017/0072852 A1 | 3/2017 | Matsuoka et al. | |
| 2017/0158127 A1 | 6/2017 | Akiyama et al. | |
| 2018/0059686 A1* | 3/2018 | Liu | B60W 30/0953 |
| 2018/0102054 A1 | 4/2018 | Naserian et al. | |
| 2018/0114443 A1* | 4/2018 | Mukai | B60W 30/085 |
| 2019/0071071 A1 | 3/2019 | Yamada et al. | |
| 2019/0180623 A1* | 6/2019 | Lee | B60W 30/095 |
| 2019/0366925 A1* | 12/2019 | Yoshihara | G08G 1/09626 |

FOREIGN PATENT DOCUMENTS

| | | | | |
|---|---|---|---|---|
| CN | 105741609 A | | 7/2016 | |
| CN | 106162521 A | * | 11/2016 | ............. G08G 1/161 |
| CN | 106530823 A | | 3/2017 | |
| CN | 109421799 A | | 3/2019 | |
| CN | 110549938 A | | 12/2019 | |
| JP | 2000113396 A | | 4/2000 | |
| JP | 2001050760 A | | 2/2001 | |
| JP | 2007302041 A | | 11/2007 | |
| JP | 2011243084 A | | 12/2011 | |
| JP | 2014002610 A | | 1/2014 | |
| JP | 2015118404 A | | 6/2015 | |
| JP | 2016081193 A | | 5/2016 | |
| JP | 2016085657 A | | 5/2016 | |
| JP | 2016115276 A | | 6/2016 | |
| JP | 2016126400 A | | 7/2016 | |
| JP | 2017058869 A | | 3/2017 | |
| JP | 2017107328 A | | 6/2017 | |
| JP | 2019211927 A | | 12/2019 | |
| JP | 2020091652 A | | 6/2020 | |
| WO | 2019138769 A1 | | 7/2019 | |

* cited by examiner

WARNING DEVICE UTILIZING AZIMUTH ANGLES OF VEHICLES

CROSS-REFERENCE TO RELATED APPLICATIONS

The present application is a U.S. National Stage entry of PCT Application number PCT/JP2021/030847, filed on Aug. 23, 2021, which claims priority under 35 U.S.C § 119 (a) to Japanese Patent Application No. 2020-141157, filed on Aug. 24, 2020, contents of which are incorporated herein by reference in their entirety.

TECHNICAL FIELD

The present disclosure relates to a warning device that informs about the approach of a vehicle.

BACKGROUND OF THE INVENTION

Patent Document 1 discloses a technique for outputting a warning in order to prevent collision if another vehicle moving in a direction that intersects with a travel direction of the subject vehicle is approaching the subject vehicle.

PRIOR ART

Patent Document

Patent Document 1: Japanese Unexamined Patent Application Publication No. 2016-126400

BRIEF DESCRIPTION OF THE INVENTION

Problem to be Solved by the Invention

As a case of a plurality of roads intersecting with each other, there is a grade-separated junction where a plurality of roads intersect with each other on different heights by making any one of the roads an overpass or underpass. In the above-described technique, even if there is no risk that the subject vehicle and another vehicle traveling in the grade-separated junction may collide, a warning is issued on the presumption that the subject vehicle and the other vehicle are approaching each other.

Accordingly, the present disclosure focuses on these points, and its object is to reduce false warnings when a subject vehicle and another vehicle are approaching each other.

Means for Solving the Problem

In a first aspect of the present disclosure, there is provided a warning device including: a subject vehicle information acquiring part that acquires a position of a subject vehicle, an azimuth angle of the subject vehicle, and vehicle speed of the subject vehicle; an other vehicle information acquiring part that acquires a position and an azimuth angle of another vehicle via vehicle-to-vehicle communication; a temporary stop determining part that determines that the subject vehicle is in a temporary stop state if a state where the vehicle speed of the subject vehicle during traveling is equal to or less than a predetermined speed continues for a predetermined time period or longer; an other vehicle approach determining part that determines that the other vehicle is approaching the subject vehicle from a side of the subject vehicle, if i) a subject vehicle travel vector starting from the position of the subject vehicle along a direction indicated by the azimuth angle of the subject vehicle and ii) an other vehicle travel vector starting from the position of the other vehicle along a direction indicated by the azimuth angle of the other vehicle intersect with each other, and if the position of the other vehicle is included in a predetermined angle range defined laterally with respect to the azimuth angle of the subject vehicle, while the temporary stop determining part determines that the subject vehicle is in the temporary stop state; and an output control part that causes a warning output part to output a warning on condition that the subject vehicle in the temporary stop state starts traveling while the other vehicle approach determining part determines that the other vehicle is approaching the subject vehicle.

The subject vehicle information acquiring part may further acquire information showing an operation position of a shift lever of the subject vehicle and whether a brake of the subject vehicle is on or off, and the temporary stop determining part may determine that the subject vehicle is in the temporary stop state when the operation position of the shift lever has continuously been a drive position from a moment at or before a moment when the vehicle speed of the subject vehicle has become equal to or less than the predetermined speed, if a state where the vehicle speed of the subject vehicle is equal to or less than the predetermined speed continues for the predetermined time period or longer with the brake being on.

The subject vehicle information acquiring part may further acquire an accelerator opening degree of the subject vehicle, and the output control part may cause the warning to be output, if the accelerator opening degree becomes larger than zero after the brake of the subject vehicle in the temporary stop state has become off while it is determined that the other vehicle is approaching the subject vehicle.

The other vehicle information acquiring part may further acquire a vehicle speed of the other vehicle, and the other vehicle approach determining part may generate the subject vehicle travel vector, along the direction indicated by the azimuth angle of the subject vehicle, having a predetermined length from the position of the subject vehicle in the temporary stop state, and may generate the other vehicle travel vector, along the direction indicated by the azimuth angle of the other vehicle from the position of the other vehicle during traveling, having a length obtained by multiplying the vehicle speed of the other vehicle by a predetermined time period, and may determine that the other vehicle is approaching the subject vehicle from the side of the subject vehicle if the generated subject vehicle travel vector and the generated other vehicle travel vector intersect with each other, and the position of the other vehicle is included in the predetermined angle range.

The other vehicle approach determining part may generate the subject vehicle travel vector along an average of directions indicated by a plurality of azimuth angles of the subject vehicle acquired immediately before, and may generate the other vehicle travel vector along an average of directions indicated by a plurality of azimuth angles of the other vehicle acquired immediately before.

The other vehicle approach determining part may determine that the other vehicle is approaching the subject vehicle from a right of the subject vehicle if the subject vehicle travel vector and the other vehicle travel vector intersect with each other, and if the position of the other vehicle is included in the predetermined angle range, which is an obtuse angle on a right side with respect to the azimuth angle of the subject vehicle while the temporary stop determining part determines that the subject vehicle is in the temporary stop state, and the other vehicle approach determining part may determine that the other vehicle is approaching the subject vehicle from a left of the subject vehicle if the position of the other vehicle is included in the predetermined angle range, which is an obtuse angle on a left side with respect to the azimuth angle of the subject vehicle.

The subject vehicle information acquiring part may acquire accuracy of the position of the subject vehicle and accuracy of the azimuth angle of the subject vehicle, the other vehicle information acquiring part may acquire accuracy of the position of the other vehicle and accuracy of the azimuth angle of the other vehicle, and the other vehicle approach determining part may determine whether or not the other vehicle is approaching the subject vehicle if the accuracy of the position of the subject vehicle and the accuracy of the position of the other vehicle are equal to or greater than a position accuracy determination threshold, and if the accuracy of the azimuth angle of the subject vehicle and the accuracy of the azimuth angle of the other vehicle are equal to or greater than an azimuth angle accuracy determination threshold.

Effect of the Invention

According to the present disclosure, it is possible to reduce false warnings when a subject vehicle and another vehicle are approaching each other.

DESCRIPTION OF EMBODIMENTS

[Configuration of the Subject Vehicle A According to the Embodiment]

Figure 1:
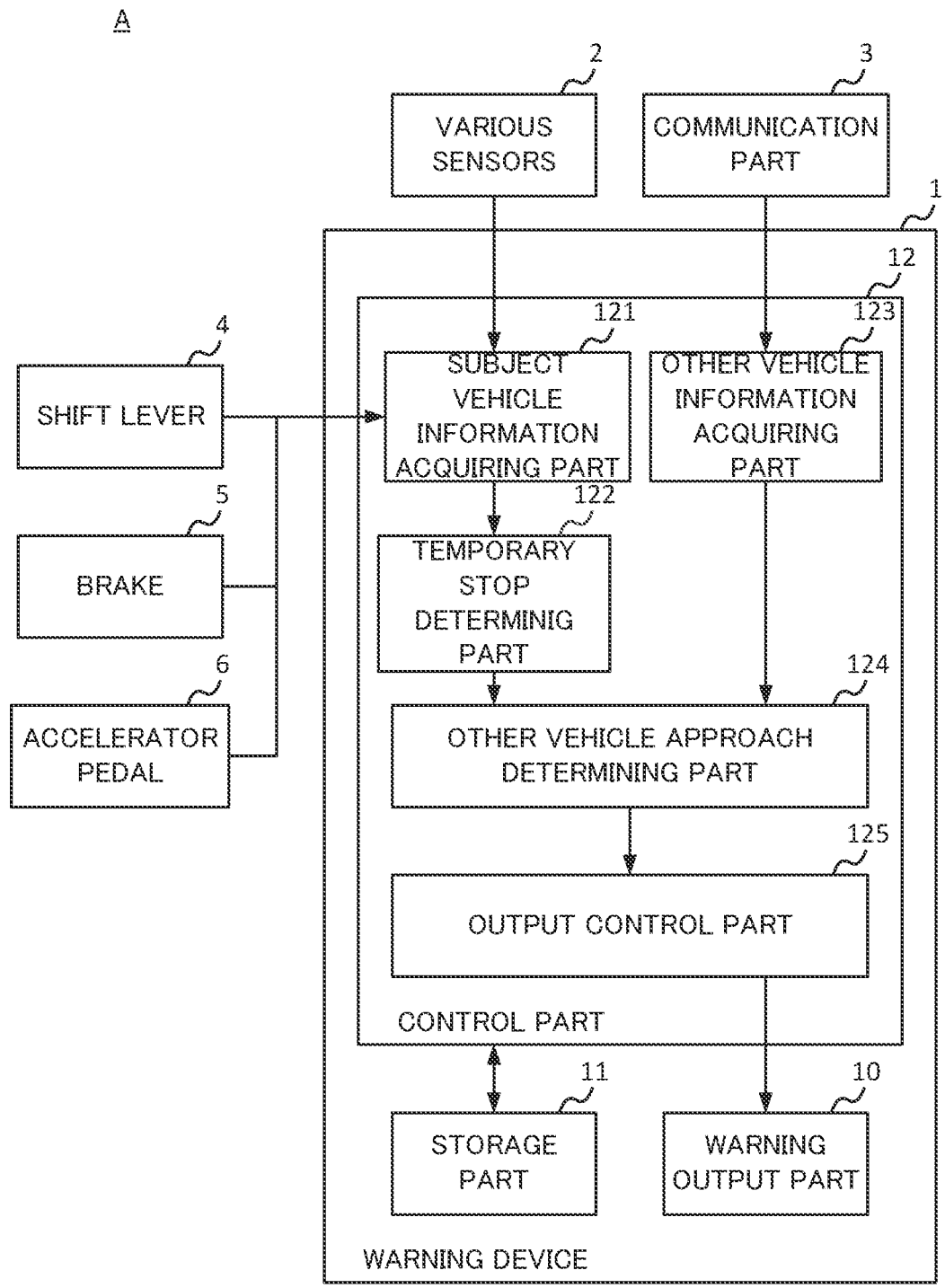
FIG. 1 schematically shows a configuration of a subject vehicle according to an embodiment.

FIG. 1 schematically shows a configuration of a subject vehicle A according to an embodiment. The subject vehicle A includes a warning device 1, various sensors 2, a communication part 3, a shift lever 4, a brake 5, and an accelerator pedal 6.

The various sensors 2 include a plurality of sensors that detect information concerning the subject vehicle A. For example, the various sensors 2 include a vehicle speed sensor that detects vehicle speed of the subject vehicle A. The various sensors 2 include a Global Positioning System (GPS) receiver that detects the position of the subject vehicle A, and specify coordinates indicating the position of the subject vehicle A. Further, the various sensors 2 can specify detection accuracy of the position of the subject vehicle A. The various sensors 2 include a geomagnetic sensor that detects an azimuth angle of the subject vehicle A, and detect the azimuth angle of the subject vehicle A with respect to north to specify detection accuracy of the azimuth angle. The various sensors 2 output detected information concerning the subject vehicle to the warning device 1.

The communication part 3 is a wireless communication module that transmits and receives information to and from another vehicle around the subject vehicle A via vehicle-to-vehicle communication. The wireless communication standard is, for example, Dedicated Short Range Communications (DSRC), but is not limited thereto. The communication part 3 receives, from the other vehicle around the subject vehicle A, information concerning the other vehicle and outputs received information concerning the other vehicle to the warning device 1.

A driver of the subject vehicle A can select a state of the transmission of the subject vehicle A by operating the shift lever 4. The shift lever 4 outputs an operation position selected by the driver to the warning device 1. The operation position is a drive position, a neutral position, or a park position, for example.

The driver of the subject vehicle A can decelerate the subject vehicle A by applying the brake 5. The brake 5 is a foot brake or air brake, for example. The brake 5 outputs information indicating whether the brake 5 is on or off to the warning device 1.

The driver of the subject vehicle A can accelerate the subject vehicle A by depressing the accelerator pedal 6. The accelerator pedal 6 outputs an accelerator opening degree corresponding to a depression amount hit by the driver. The accelerator opening degree is set to zero when the accelerator pedal 6 is not depressed, and is set to 100 when the accelerator pedal 6 is depressed to the maximum.

The warning device 1 determines whether or not the subject vehicle A during traveling is in a temporary stop state on the basis of the information concerning the subject vehicle A acquired by the various sensors 2. Next, if the subject vehicle A is in the temporary stop state, the warning device 1 determines whether or not each of a plurality of other vehicles is approaching the subject vehicle A from its sides on the basis of information concerning the plurality of other vehicles traveling around the subject vehicle A. Then, the warning device 1 outputs a warning indicating that the other vehicle is approaching the subject vehicle A if the subject vehicle A ends the temporary stopping to start traveling, when another vehicle is approaching the subject vehicle A from its side. By doing so, if the driver of the subject vehicle A ends the temporary stopping to start traveling of the subject vehicle A when the other vehicle is approaching the subject vehicle A from its left or right side, the warning device 1 outputs a warning to alert the driver.

Hereinafter, a case where vehicles travel on the left side on a road separated by the center, so-called left-hand traffic, will be described.

[Configuration of the Warning Device 1]

The warning device 1 includes a warning output part 10, a storage part 11, and a control part 12. The warning output part 10 includes, for example, a speaker or a buzzer, and outputs an audio warning under the control of the control part 12.

The storage part 11 includes storage media such as a Read Only Memory (ROM), a Random Access Memory (RAM), and a hard disk. The storage part 11 stores a program executed by the control part 12.

The control part 12 is a calculation resource including a processor such as a Central Processing Unit (CPU). By executing a program stored in the storage part 11, the control part 12 functions as a subject vehicle information acquiring part 121, a temporary stop determining part 122, an other vehicle information acquiring part 123, an other vehicle approach determining part 124, and an output control part 125.

The subject vehicle information acquiring part 121 sequentially acquires information concerning the subject vehicle A detected by the various sensors 2. For example, the subject vehicle information acquiring part 121 acquires vehicle speed of the subject vehicle A. Further, the subject vehicle information acquiring part 121 acquires coordinates indicating the position of the subject vehicle A and an azimuth angle of the subject vehicle A.

The subject vehicle information acquiring part 121 acquires an operation position of the shift lever 4 of the subject vehicle A from the shift lever 4. For example, the subject vehicle information acquiring part 121 acquires information showing whether the operation position of the shift lever 4 of the subject vehicle A is the drive position, neutral position, or park position. Further, the subject vehicle information acquiring part 121 acquires, from the brake 5, information showing whether the brake 5 of the subject vehicle A is on or off. Furthermore, the subject vehicle information acquiring part 121 acquires an accelerator opening degree of the subject vehicle A from the accelerator pedal 6.

On the basis of the information concerning the subject vehicle A acquired by the subject vehicle information acquiring part 121, the temporary stop determining part 122 determines whether or not the subject vehicle A during traveling is in the temporary stop state. For example, if a state where the vehicle speed of the subject vehicle A during traveling is equal to or less than a predetermined speed continues for a predetermined time period or longer, the temporary stop determining part 122 determines that the subject vehicle A is in the temporary stop state. A specific value of the predetermined speed is three kilometers per hour, for example. A specific value of the predetermined time period is one second, for example. Specifically, the temporary stop determining part 122 determines that the subject vehicle A during traveling came to a temporary stop if a state where the vehicle speed of the subject vehicle A is equal to or less than the predetermined speed continues for the predetermined time period (one second) or longer, from when the subject vehicle A that was traveling at a speed greater than the predetermined speed (three kilometers per hour) decelerated to reach a speed equal to or less than the predetermined speed previously.

Figure 2A:
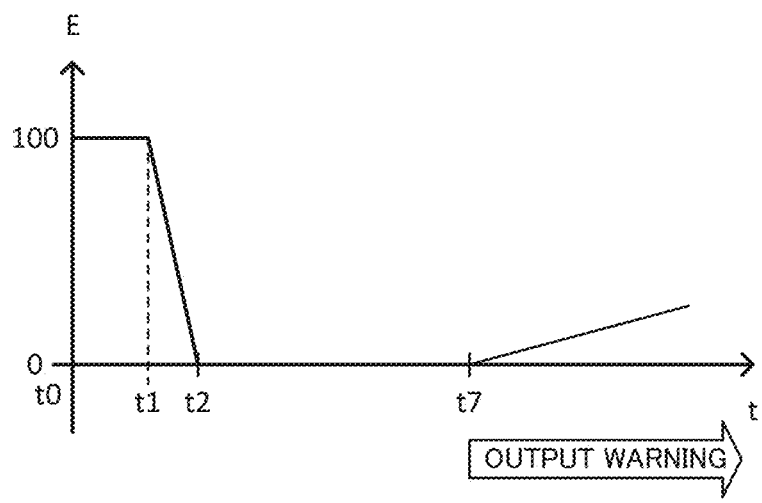
FIG. 2A schematically shows a change over time in an accelerator opening degree E of the subject vehicle.
Figure 2B:
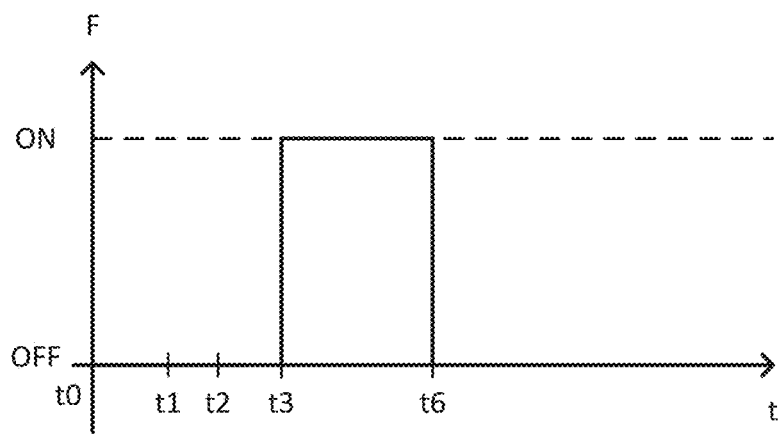
FIG. 2B schematically shows a change over time in a state of a brake.
Figure 2C:
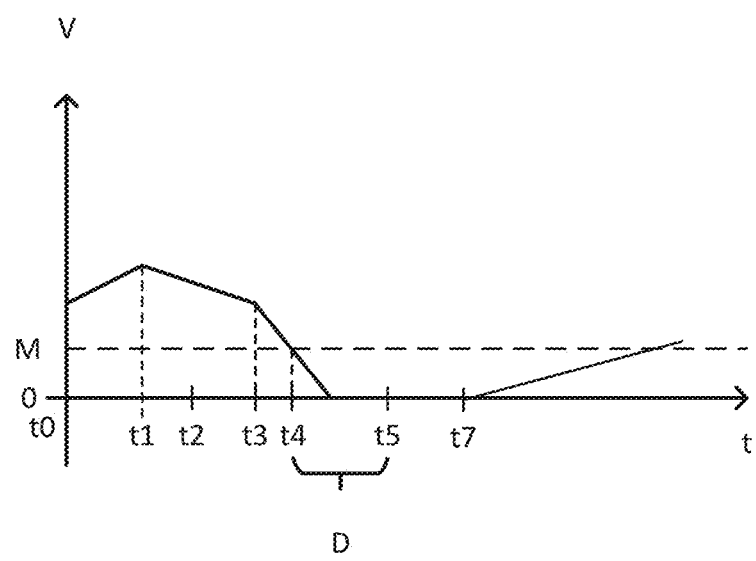
FIG. 2C schematically shows a change over time in vehicle speed.

FIG. 2A schematically shows a change over time in an accelerator opening degree E of the subject vehicle A. The vertical axis of FIG. 2A represents the accelerator opening degree E, and the horizontal axis of FIG. 2A represents a timing t. FIG. 2B schematically shows a change over time in a state of the brake 5. The vertical axis of FIG. 2B represents a state of a flag F indicating whether the brake 5 is on or off, and the horizontal axis of FIG. 2B represents a timing t. FIG. 2C schematically shows a change over time in vehicle speed V. The vertical axis of FIG. 2C represents the vehicle speed V, and the horizontal axis of FIG. 2C represents a timing t.

In FIG. 2A, the accelerator opening degree E remains constant from a timing t0 to a timing t1. Therefore, the vehicle speed V increases from the timing to to the timing t1 (see FIG. 2C).

At the timing t1, the driver of the subject vehicle A stops depressing the accelerator pedal 6, and gradually decreases the depression amount of the accelerator pedal 6 from the timing t1 to a timing t2. Therefore, from the timing t1 to the timing t2, the accelerator opening degree E decreases (see FIG. 2A), and so the vehicle speed V decreases (see FIG. 2C).

Subsequently, the driver of the subject vehicle A applied the brake 5 to make it "on" at a timing t3 in order to have the subject vehicle A enter the temporary stop state. As shown in FIG. 2B, the flag F of the brake 5 is switched from "off" to "on" at the timing t3. As shown in FIG. 2C, the rate at which the vehicle speed V decreases from the timing t3 to when the vehicle speed V becomes zero is larger than that of a case where the brake 5 is off.

The temporary stop determining part 122 determines that the subject vehicle A is in the temporary stop state if a state where the vehicle speed V is equal to or less than a predetermined speed M continues, from a timing t4 when the vehicle speed V decreased to be equal to or less than the predetermined speed M with the brake 5 being on until a timing t5 when a predetermined time period D has passed from the timing t4. A specific value of the predetermined speed M is three kilometers per hour, for example. A specific value of the predetermined time period D is one second, for example.

Further, the temporary stop determining part 122 may determine whether or not the subject vehicle A is in the temporary stop state further on the basis of the operation position of the shift lever 4. For example, if the operation position of the shift lever 4 is the drive position, it is assumed that the driver of the subject vehicle A is going to start traveling of the subject vehicle sometime soon. Therefore, if the operation position of the shift lever 4 is the drive position, the temporary stop determining part 122 determines that the subject vehicle A is in the temporary stop state. Specifically, the temporary stop determining part 122 determines that the subject vehicle A is in the temporary stop state when, in a case where the operation position of the shift lever 4 has continuously been the drive position from a moment at or before a timing t4 at which the vehicle speed V of the subject vehicle A decreased to be equal to or less than the predetermined speed M, a state where the vehicle speed V is equal to or less than the predetermined speed M continues for the predetermined time period D or longer. In this manner, the temporary stop determining part 122 can accurately determine whether or not the subject vehicle A is in the temporary stop state compared to a case where the operation position of the shift lever 4 is not taken into account.

The other vehicle information acquiring part 123 acquires information concerning another vehicle from each of a plurality of other vehicles traveling around the subject vehicle A via the communication part 3 through the vehicle-to-vehicle communication. Specifically, the other vehicle information acquiring part 123 acquires a vehicle speed of the other vehicle, as well as coordinates and an azimuth angle indicating the position of the other vehicle detected by the other vehicle. Thus, the other vehicle information acquiring part 123 can directly acquire the information concerning the other vehicle from the other vehicle whose information has been detected. Therefore, the other vehicle information acquiring part 123 can acquire more accurate information concerning the other vehicle compared to the case of acquiring the information concerning the other vehicle by other methods (e.g., a method of acquiring information concerning the other vehicle by analyzing a captured image, or a method of acquiring information concerning the other vehicle by analyzing signals detected by Light Detection and Ranging (LIDAR)).

Figure 3:
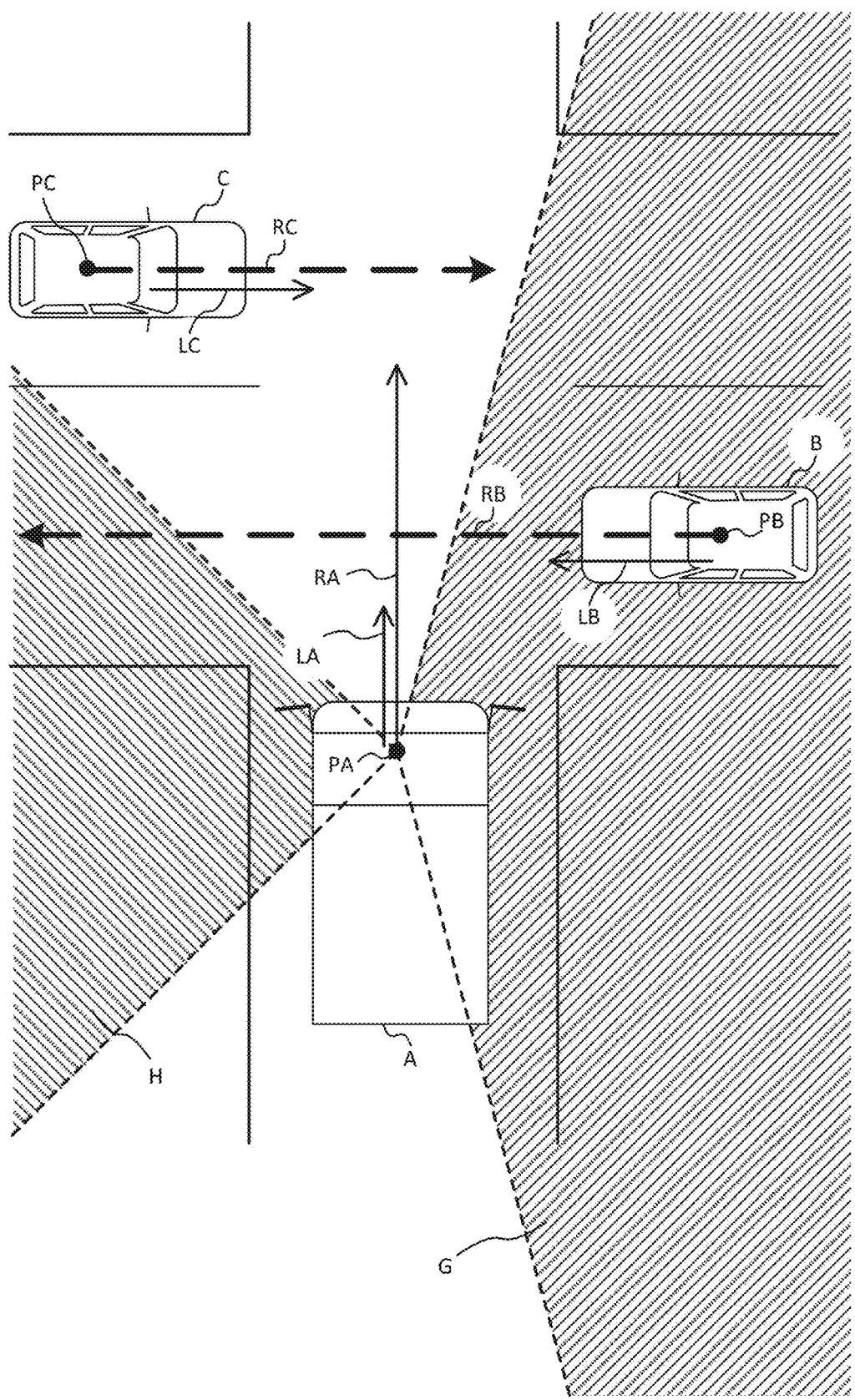
FIG. 3 is a diagram for explaining processing of determining whether another vehicle is approaching the subject vehicle from the right of the subject vehicle.

Next, processing by the other vehicle approach determining part 124 for determining whether or not each of a plurality of other vehicles traveling around the subject vehicle A is approaching the subject vehicle A from the right of the subject vehicle A will be described. FIG. 3 is a diagram for explaining processing of determining whether the other vehicle is approaching the subject vehicle A from the right of the subject vehicle A. In FIG. 3, the subject vehicle A traveling on a road, which intersects with a priority road in the right-left direction of the drawing, stopped temporarily in front of an intersection (the vehicle speed V of the subject vehicle A is zero). Here, it is assumed that the subject vehicle A is going to enter the priority road. Although an other vehicle B will be described here as an example of another vehicle, similar processing is performed on an other vehicle C shown in FIG. 3.

As shown in FIG. 3, the distance between the subject vehicle A entering the intersection from the road that intersects with the priority road, and the other vehicle B approaching the subject vehicle A from the right of the subject vehicle A is shorter than the distance between the other vehicle C approaching the subject vehicle A from the left of the subject vehicle A and the subject vehicle A. If the driver recognizes the other vehicle B approaching the subject vehicle A from the right of the subject vehicle A after entering the intersection, the time allowed for the driver to perform an operation for avoiding the other vehicle B is short. Therefore, if the other vehicle is approaching the subject vehicle A from the right, the driver of the subject vehicle A should be warned that the other vehicle B is approaching from the right.

On the other hand, the distance between the other vehicle C approaching from the left of the subject vehicle A and the subject vehicle A is longer than the distance between the other vehicle B approaching from the right of the subject vehicle A and the subject vehicle A. As a result, even if the driver recognizes the other vehicle C approaching the subject vehicle A from the left of the subject vehicle A after entering the intersection, the time allowed for the driver to perform an operation for avoiding the other vehicle C is long. Therefore, if the other vehicle C is approaching the subject vehicle A from the left, it is not necessary to warn the driver of the subject vehicle A that the other vehicle C is approaching from the left.

Here, while the subject vehicle A during traveling is in the temporary stop state, the other vehicle approach determining part 124 determines whether or not each of the plurality of other vehicles that are present in the vicinity of the subject vehicle A is approaching the subject vehicle A from the right of the subject vehicle A, on the basis of the information concerning the other vehicles. Specifically, the other vehicle approach determining part 124 determines that the other vehicle is approaching the subject vehicle A from the right of the subject vehicle A if a subject vehicle travel vector indicating a travel direction of the subject vehicle A and an other vehicle travel vector indicating a travel direction of the other vehicle intersect with each other, and if the other vehicle is present to the right of the subject vehicle A while the subject vehicle A is in the temporary stop state.

First, the other vehicle approach determining part 124 generates a subject vehicle travel vector RA, along a direction indicated by the azimuth angle of the subject vehicle A (hereinafter referred to as a subject vehicle direction LA), having a predetermined length from a position PA of the subject vehicle A in the temporary stop state. The position PA where the subject vehicle travel vector RA starts is a position of a GPS receiver installed in the subject vehicle A. A specific value of the predetermined length may be appropriately set, and is 10 meters, for example.

It should be noted that the other vehicle approach determining part 124 determines an average of directions indicated by a plurality of azimuth angles of the subject vehicle A acquired immediately before as the subject vehicle direction LA. For example, the other vehicle approach determining part 124 determines the direction indicated by an average value of a plurality of azimuth angles of the subject vehicle A detected within a predetermined distance (e.g., 30 meters) from the current position PA of the subject vehicle A as the subject vehicle direction LA. The azimuth angle of the subject vehicle A is detected every two meters.

Next, the other vehicle approach determining part 124 generates an other vehicle travel vector RB along a direction indicated by the azimuth angle of the other vehicle B (hereinafter referred to as an other vehicle direction LB) from a position PB of the other vehicle B. For example, the other vehicle approach determining part 124 generates the other vehicle travel vector RB having a predetermined length from the position PB of the other vehicle B. Specifically, the other vehicle approach determining part 124 generates the other vehicle travel vector RB having a predetermined length obtained by multiplying vehicle speed of the other vehicle B during traveling by a predetermined, estimated time period. The position PB where the other vehicle travel vector RB starts is a position of a GPS receiver installed in the other vehicle B. A specific value of the predetermined estimated time period may be appropriately set, and is five seconds, for example. Alternatively, the other vehicle approach determining part 124 may use a direction indicated by an average value of 10 azimuth angles of the other vehicle B acquired immediately before as the direction of the other vehicle B. In this way, since the other vehicle approach determining part 124 generates the other vehicle travel vector RB using the information concerning the other vehicle B directly acquired from the other vehicle B by the other vehicle information acquiring part 123, it is possible to generate a more accurate other vehicle travel vector RB compared to the case of acquiring the information concerning the other vehicle by other methods.

Then, the other vehicle approach determining part 124 determines whether or not the other vehicle B is approaching from the right of the subject vehicle A. For example, the other vehicle approach determining part 124 determines whether or not the generated subject vehicle travel vector RA and the generated other vehicle travel vector RB intersect with each other, thereby determining whether or not the other vehicle B is approaching from the right of the subject vehicle A. As described above, since the other vehicle approach determining part 124 can generate an accurate other vehicle travel vector RB by using accurate information concerning the other vehicle, it is possible to improve accuracy of determining whether or not the subject vehicle travel vector RA and the other vehicle travel vector RB intersect with each other. As a result, the other vehicle approach determining part 124 can improve the accuracy of determining whether or not the other vehicle B is approaching from the right of the subject vehicle A, and can prevent accidentally determining that the other vehicle B is approaching even though the other vehicle B is not approaching from the right of the subject vehicle A.

In FIG. 3, the other vehicle approach determining part 124 determines that the other vehicle B is approaching the subject vehicle A from the right of the subject vehicle A because the other vehicle travel vector RB of the other vehicle B and the subject vehicle travel vector RA intersect with each other. On the other hand, the other vehicle approach determining part 124 determines that the other vehicle C is not approaching the subject vehicle A from the right because an other vehicle travel vector RC of the other vehicle C and the subject vehicle travel vector RA do not intersect with each other.

Further, the other vehicle approach determining part 124 determines that the other vehicle B is approaching from the right of the subject vehicle A if a direction indicated by the other vehicle travel vector RB is included in a predetermined range H (see FIG. 3) defined with respect to the subject vehicle travel vector RA. In FIG. 3, the range H is a range filled with negatively-sloped lines. Specifically, the other vehicle approach determining part 124 determines that the other vehicle B is approaching from the right of the subject vehicle A if the azimuth angle indicating the direction of the other vehicle travel vector RB indicated by the average value of the plurality of azimuth angles (e.g., 10 azimuth angles) of the other vehicle B acquired immediately before is included in the predetermined range H from −135 degrees to −45 degrees with respect to the azimuth angle indicating the subject vehicle travel vector RA.

Next, the other vehicle approach determining part 124 determines whether or not the other vehicle B is present to the right of the subject vehicle A, on the basis of whether or not the other vehicle B is included in a predetermined angle range G on the side of the subject vehicle A. For example, the other vehicle approach determining part 124 determines that the other vehicle B is present to the right of the subject vehicle A if the position PB of the other vehicle B is included in the predetermined angle range G. The predetermined angle range G is an obtuse angle, and is from +15 degrees to +165 degrees with respect to the azimuth angle indicating the subject vehicle direction LA, for example.

In FIG. 3, the predetermined angle range G is a range filled with positively-sloped lines. Since the position PB of the other vehicle B is included in the predetermined angle range G, the other vehicle approach determining part 124 determines that the other vehicle B is present to the right of the subject vehicle A. On the other hand, since the position PC of the other vehicle C is not included in the predetermined angle range G, the other vehicle approach determining part 124 determines that the other vehicle C is not present to the right of the subject vehicle A.

If the accuracy of positions and the accuracy of azimuth angles are high, the other vehicle approach determining part 124 may determine whether or not the other vehicle B is approaching the subject vehicle A. In this case, the subject vehicle information acquiring part 121 acquires detection accuracy of the position PA and detection accuracy of the azimuth angle of the subject vehicle A, from the various sensors 2. For example, the subject vehicle information acquiring part 121 acquires any value from 0 to 15 as the detection accuracy of the position PA of the subject vehicle A. The larger the values is, the higher the detection accuracy is assumed to be. It should be noted that the detection accuracy of the azimuth angle is assumed to be the same as the detection accuracy of the position. The other vehicle information acquiring part 123 acquires detection accuracy of the position PB and detection accuracy of the azimuth angle of the other vehicle B from the other vehicle B via the vehicle-to-vehicle communication. The detection accuracy of the position PB and the detection accuracy of the azimuth angle of the other vehicle B are the same as the detection accuracy of the position PA and the detection accuracy of the azimuth angle of the subject vehicle A, respectively.

The other vehicle approach determining part 124 determines whether or not the other vehicle B is approaching the subject vehicle A if the detection accuracy of the position PA of the subject vehicle A and the detection accuracy of the position PB of the other vehicle B are equal to or greater than a position accuracy determination threshold, and if the detection accuracy of the azimuth angle of the subject vehicle A and the detection accuracy of the azimuth angle of the other vehicle B are equal to or greater than an azimuth angle accuracy determination threshold. The other vehicle approach determining part 124 does not determine whether or not the other vehicle B is approaching the subject vehicle A if any one of the above conditions is not satisfied. A specific value of the position accuracy determination threshold is 10, for example. A specific value of the azimuth angle accuracy determination threshold is 4, for example. As described above, since the other vehicle approach determining part 124 does not determine whether or not the other vehicle B is approaching if one of the accuracy of the position or the accuracy of the azimuth angle is relatively low, false determination due to relatively low accuracy of the position or azimuth angle can be prevented.

The other vehicle approach determining part 124 determines that the other vehicle B is approaching the subject vehicle A from the right if the subject vehicle travel vector RA and the other vehicle travel vector RB intersect with each other, and if the other vehicle B is present to the right of the subject vehicle A. Further, the other vehicle approach determining part 124 determines that the other vehicle B is not approaching the subject vehicle A from the right if the subject vehicle travel vector RA and the other vehicle travel vector RB do not intersect with each other, or if the other vehicle B is not present to the right of the subject vehicle A. In this way, the other vehicle approach determining part 124 can exclude another vehicle (the other vehicle C in FIG. 3) that is not approaching the subject vehicle A from the right, thereby increasing the probability of identifying, from the plurality of other vehicles traveling around the subject vehicle A, the other vehicle B approaching the subject vehicle A from the right.

The output control part 125 causes the warning output part 10 to output a warning indicating that the other vehicle B is approaching the subject vehicle A if the subject vehicle A started traveling while the other vehicle B is approaching the subject vehicle A. For example, the output control part 125 causes the warning output part 10 to output a warning if the subject vehicle A in the temporary stop state started traveling while the other vehicle B during traveling is approaching the subject vehicle A from the right. Specifically, the output control part 125 causes a warning to be output if the accelerator opening degree E becomes larger than a predetermined opening after the brake 5 of the subject vehicle A in the temporary stop state has become off while it is determined that the other vehicle B is approaching the subject vehicle A from the right. A specific value of the predetermined opening is 0, for example.

Due to this, the output control part 125 can cause the warning output part 10 to output a warning if the driver of the subject vehicle A starts depressing the accelerator pedal 6 to drive the subject vehicle A even though the other vehicle B during traveling is approaching the subject vehicle A from the right. In this way, the output control part 125 can output a warning indicating that the other vehicle B is approaching the subject vehicle A from the right in a situation that necessitates a warning, where the driver has little time to perform an operation for avoiding the other vehicle B approaching the subject vehicle A from the right of the subject vehicle A. As a result, the output control part 125 can enhance the safety of the subject vehicle A.

Further, the output control part 125 does not output a warning when the subject vehicle A is not in the temporary stop state, even if the other vehicle is approaching the subject vehicle A from the right of the subject vehicle A. A state where the other vehicle is approaching the subject vehicle A while the subject vehicle A is not coming to a temporary stop can be conceived of as a situation where the subject vehicle A is traveling in a grade-separated junction, and the subject vehicle A and the other vehicle B are traveling on different roads. Accordingly, since the output control part 125 does not output a warning if the subject vehicle A is traveling in a grade-separated junction, it is possible to prevent false warnings from being issued in a situation in which there is no risk of collision, where the subject vehicle A and the other vehicle travel in the grade-separated junction. Further, the output control part 125 does not causes a warning to be output if the other vehicle is not approaching the subject vehicle A from the right. In other words, the output control part 125 does not output a warning in a situation where the other vehicle is approaching the subject vehicle A from the left, meaning that the driver has a long time to perform an operation for avoiding the other vehicle. As a result, the output control part 125 can prevent the issue of unnecessary warnings.

[Processing of Determining Whether or not the Subject Vehicle a During Traveling has Entered the Temporary Stop State]

Figure 4:
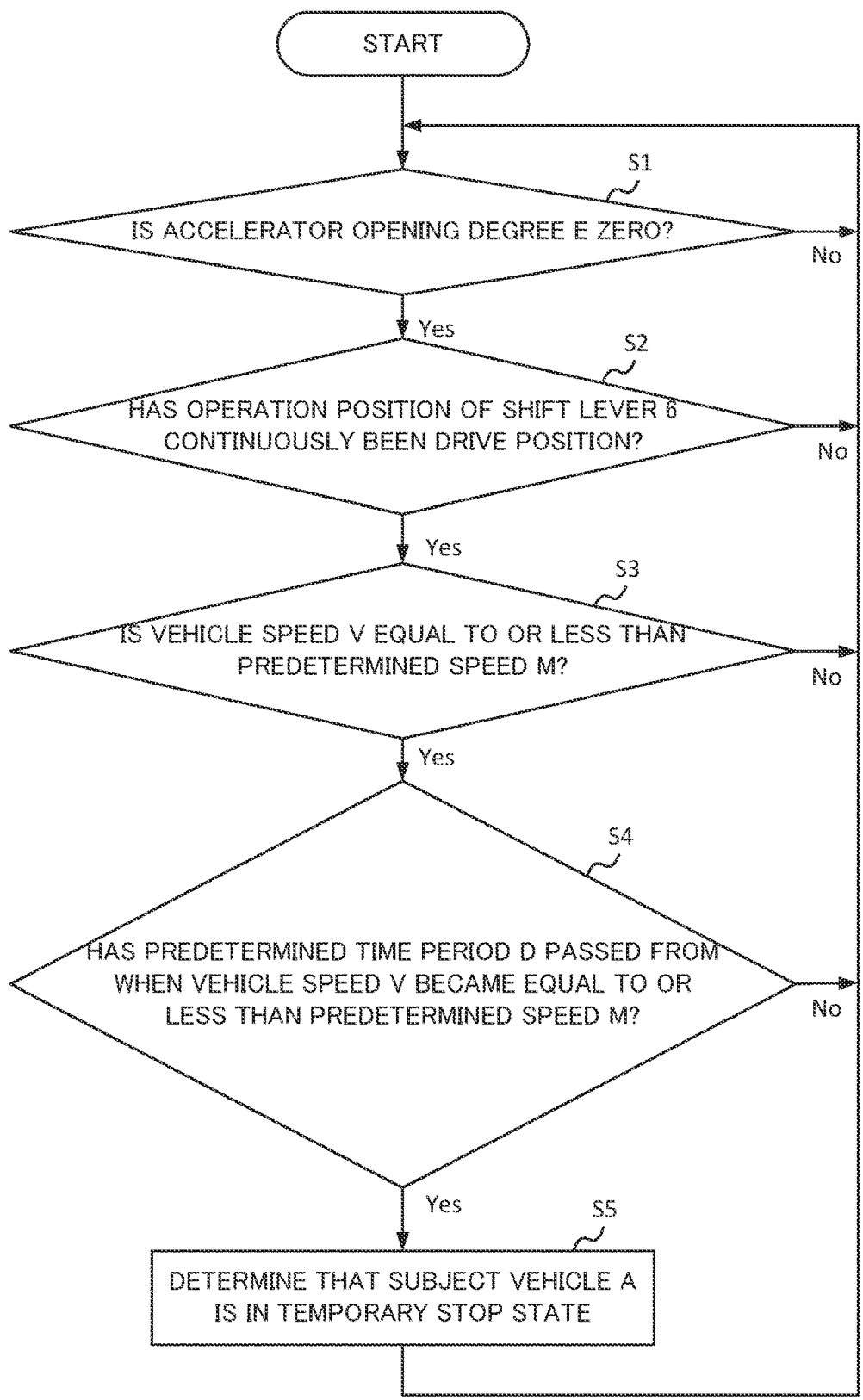
FIG. 4 is a flowchart showing an example of processing of determining whether or not the subject vehicle during traveling has entered a temporary stop state.

FIG. 4 is a flowchart showing an example of processing of determining whether the subject vehicle A during traveling has entered the temporary stop state. The temporary stop determining part 122 sequentially executes the processing shown in FIG. 4 while the subject vehicle A is activated. Further, it is assumed that the subject vehicle information acquiring part 121 sequentially acquires various types of information concerning the subject vehicle A.

The temporary stop determining part 122 determines whether or not the accelerator opening degree E is zero (S1). If the accelerator opening degree E is not zero ("No" in S1), the temporary stop determining part 122 determines that the subject vehicle A is not in the temporary stop state, and returns to S1.

If the accelerator opening degree E has become zero ("Yes" in S1), the temporary stop determining part 122 determines whether or not the operation position of the shift lever 4 has continuously been the drive position (S2). For example, if the operation position of the shift lever 4 has continuously been the drive position from a moment at or before the moment when the accelerator opening degree E became zero to the present moment, the temporary stop determining part 122 determines that the operation position of the shift lever 4 has continuously been the drive position. Alternatively, the temporary stop determining part 122 returns to S1 if the operation position of the shift lever 4 has not continuously been the drive position, or if the operation position of the shift lever 4 is shifted to be a position different than the drive position (a neutral position or park position) after the accelerator opening degree E has become zero ("No" in S2).

The temporary stop determining part 122 determines whether or not the vehicle speed V is equal to or less than the predetermined speed M (S3) if the shift lever 4 has been kept in the drive position ("Yes" in S2). If the vehicle speed V acquired by the subject vehicle information acquiring part 121 is greater than the predetermined speed M ("No" in S3), the temporary stop determining part 122 determines that the subject vehicle A is not in the temporary stop state, and returns to S1.

If the vehicle speed V is equal to or less than the predetermined speed M ("Yes" in S3), the temporary stop determining part 122 counts an elapsed time period from the moment when it is determined that the vehicle speed V is equal to or less than the predetermined speed M. Then, the temporary stop determining part 122 determines whether or not the predetermined time period D has passed from the moment when it was determined that the vehicle speed V became equal to or less than the predetermined speed M (step S4). If the predetermined time period D has not passed from when the vehicle speed V became equal to or less than the predetermined speed M ("No" in S4), the temporary stop determining part 122 determines that the subject vehicle A is not in the temporary stop state, and returns to S1. If the predetermined time period D has passed from when the vehicle speed V became equal to or less than the predetermined speed M ("Yes" in S4), the temporary stop determining part 122 determines that the subject vehicle A is in the temporary stop state (S5).

[Processing of Determining Whether or not the Other Vehicle B is Approaching the Subject Vehicle a from the Right]

Figure 5:
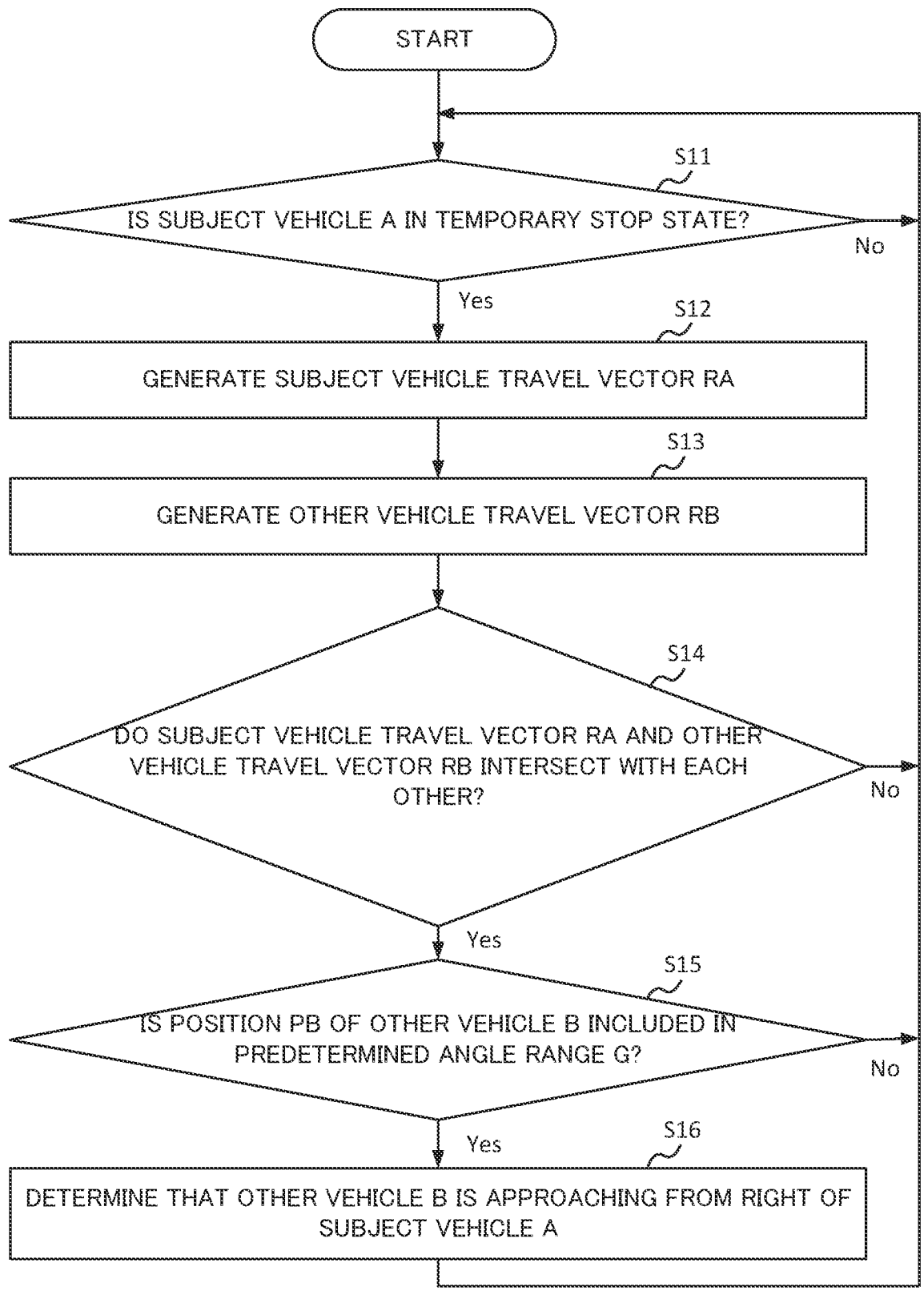
FIG. 5 is a flowchart showing an example of processing of determining whether or not another vehicle is approaching the subject vehicle from the right.

FIG. 5 is a flowchart showing an example of processing of determining whether or not the other vehicle B is approaching the subject vehicle A from the right. The other vehicle approach determining part 124 sequentially executes the processing shown in FIG. 5 at the same timing as the timing when the temporary stop determining part 122 executes the processing of determining whether or not the subject vehicle A during traveling has entered the temporary stop state. Further, it is assumed that the other vehicle information acquiring part 123 sequentially acquires various types of information concerning the other vehicle B.

First, the other vehicle approach determining part 124 determines whether or not the subject vehicle A during traveling is in the temporary stop state (S11). For example, the other vehicle approach determining part 124 determines whether or not the temporary stop determining part 122 has determined that the subject vehicle A is in the temporary stop state. If the subject vehicle A is not in the temporary stop state ("No" in S11), the other vehicle approach determining part 124 returns to S11.

If the subject vehicle A is in the temporary stop state ("Yes" in S11), the other vehicle approach determining part 124 generates the subject vehicle travel vector RA (S12). Specifically, the other vehicle approach determining part 124 generates the subject vehicle travel vector RA, along the subject vehicle direction LA from the position PA of the subject vehicle A, having a length of 10 meters. Subsequently, the other vehicle approach determining part 124 generates the other vehicle travel vector RB (S13). Specifically, the other vehicle approach determining part 124 generates the other vehicle travel vector RB having a length obtained by multiplying the vehicle speed of the other vehicle B by a predetermined time period (five seconds). Alternatively, the other vehicle approach determining part 124 may execute either the processing of S12 or the processing of S13 first, or may execute the processing of both in parallel.

The other vehicle approach determining part 124 determines whether or not the generated subject vehicle travel vector RA and the generated other vehicle travel vector RB intersect with each other (S14). If the subject vehicle travel vector RA and the other vehicle travel vector RB do not intersect with each other ("No" in S14), the other vehicle approach determining part 124 determines that the other vehicle B is not approaching the subject vehicle A, and returns to S11.

If the subject vehicle travel vector RA and the other vehicle travel vector RB intersect with each other ("Yes" in S14), the other vehicle approach determining part 124 determines whether or not the position PB of the other vehicle B is included in the predetermined angle range G (S15). For example, the other vehicle approach determining part 124 determines whether or not the position PB of the other vehicle B is included in the predetermined angle range G, which is an obtuse angle and set with respect to the azimuth angle indicating the subject vehicle direction LA.

If the position PB of the other vehicle B is not included in the predetermined angle range G ("No" in S15), the other vehicle approach determining part 124 determines that the other vehicle B is not approaching the subject vehicle A from the right, and returns to S11. If the position PB of the other vehicle B is included in the predetermined angle range G ("Yes" in S15), the other vehicle approach determining part 124 determines that the other vehicle B is approaching the subject vehicle A from the right. It should be noted that the other vehicle approach determining part 124 executes the above-described processing for each of a plurality of other vehicles traveling around the subject vehicle A.

[Processing of Outputting a Warning]

Figure 6:
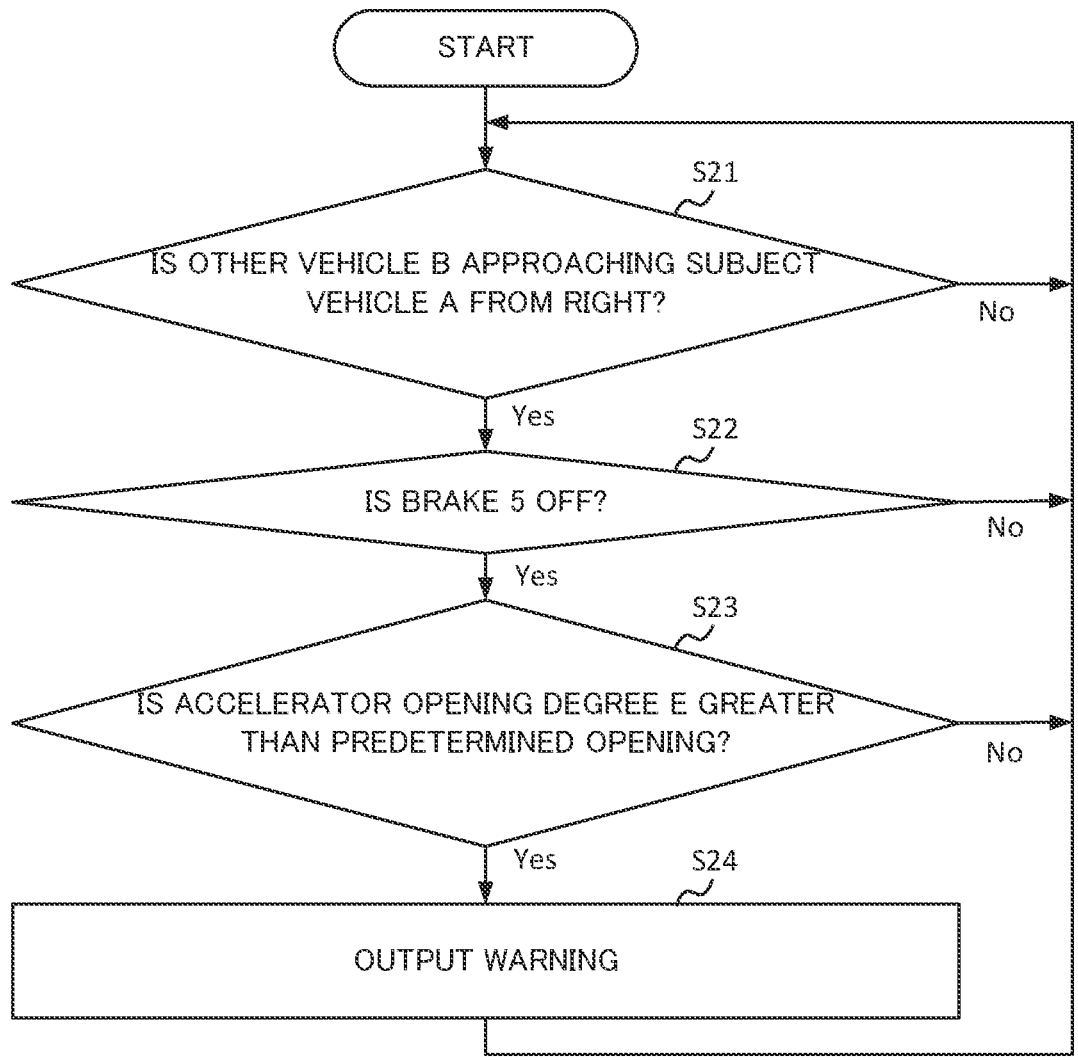
FIG. 6 is a flowchart showing an example of processing of outputting a warning.

FIG. 6 is a flowchart showing an example of processing of outputting a warning. The output control part 125 sequentially executes the processing shown in FIG. 6 at the same timing as the timing when the temporary stop determining part 122 executes the processing of determining whether or not the subject vehicle A during traveling has entered the temporary stop state.

First, the output control part 125 determines whether or not the other vehicle B is approaching the subject vehicle A from the right (S21). For example, the output control part 125 determines whether or not the other vehicle approach determining part 124 has determined that the other vehicle B is approaching the subject vehicle A from the right. If the other vehicle B is not approaching the subject vehicle A from the right ("No" in S21), the output control part 125 returns to S21.

If the other vehicle B is approaching the subject vehicle A from the right ("Yes" in S21), the output control part 125 determines whether or not the brake 5 of the subject vehicle A is off (S22). If the brake 5 of the subject vehicle A is on ("No" in S22), the output control part 125 returns to S21.

If the brake 5 of the subject vehicle A is off ("Yes" in S22), the output control part 125 determines whether or not the accelerator opening degree E of the subject vehicle A is larger than the predetermined opening (S23). For example, the output control part 125 determines whether or not the accelerator opening degree of the subject vehicle A is larger than zero, assuming the predetermined opening to be zero. If the accelerator opening degree is equal to or less than the predetermined opening (i.e., the accelerator opening degree E is zero) ("No" in S23), the output control part 125 returns to S21.

If the accelerator opening degree E of the subject vehicle A is larger than the predetermined opening ("Yes" in S23), the output control part 125 regards the subject vehicle A as having ended temporary stopping to start traveling, and then causes a warning to be output (S24).

[Effects of the Warning Device 1 According to the Embodiment]

As described above, the warning device 1 according to the embodiment acquires the position of the subject vehicle A, the azimuth angle of the subject vehicle A, and the vehicle speed V of the subject vehicle A, together with the position PB and the azimuth angle of the other vehicle B via the vehicle-to-vehicle communication. Next, if a state where the vehicle speed V of the subject vehicle A during traveling is equal to or less than the predetermined speed M continues for the predetermined time period D or longer, the warning device 1 determines that the subject vehicle A is in the temporary stop state. Next, the warning device 1 determines that the other vehicle B is approaching the subject vehicle A from the right of the subject vehicle A when the subject vehicle A is in the temporary stop state, if the subject vehicle travel vector starting from the position PA of the subject vehicle A along the direction indicated by the azimuth angle of the subject vehicle A and the other vehicle travel vector starting from the position PB of the other vehicle B along the direction indicated by the azimuth angle of the other vehicle B intersect with each other, and if the position PB of the other vehicle B is included in the predetermined angle range G on the right side with respect to the azimuth angle of the subject vehicle A. Then, the warning device 1 causes a warning to be output if the subject vehicle A in the temporary stop state starts traveling while the other vehicle B is approaching the subject vehicle A.

In this manner, the warning device 1 outputs a warning if the subject vehicle A in the temporary stop state starts traveling when the other vehicle B is approaching the subject vehicle A from the right of the subject vehicle A. Due to this, the warning device 1 outputs a warning only in a situation that necessitates a warning, where the driver has little time to perform an operation for avoiding the other vehicle that is approaching the subject vehicle A from the right of the subject vehicle A. On the other hand, the warning device 1 does not output a warning even if the other vehicle B is approaching the subject vehicle A from the right of the subject vehicle A if the subject vehicle A is not in the temporary stop state but is traveling. As a result, if there is no risk of collision between the other vehicle B and the subject vehicle A, which is traveling in a grade-separated junction, for example, the warning device 1 does not output a warning. This makes it possible to reduce false warnings.

In the above-described embodiment, the case of so-called left-hand traffic, where vehicles travel on the left on a road separated by the center has been described. The present disclosure is not limited to this, and can also be applied to the case of so-called right-hand traffic, where vehicles travel on the right on a road separated by the center. In this case, the other vehicle approach determining part 124 determines whether or not each of a plurality of other vehicles traveling around the subject vehicle A is approaching the subject vehicle A from the left of the subject vehicle A. For example, if the position of the other vehicle is included in a predetermined angle range, which is an obtuse angle and is set to the left side with respect to the azimuth angle LA of the subject vehicle A, the other vehicle approach determining part 124 determines that the other vehicle is approaching the subject vehicle A from the left of the subject vehicle A. Further, if the azimuth angle indicating the direction indicated by the other vehicle travel vector RB is included in a range from +45 degrees to +135 degrees with respect to the azimuth angle indicating the subject vehicle travel vector RA, the other vehicle approach determining part 124 determines that the other vehicle B is approaching from the left of the subject vehicle A.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

DESCRIPTION OF THE REFERENCE NUMERALS 1 warning device
2 various sensors
3 communication part
4 shift lever
5 brake
6 accelerator pedal
10 warning output part
11 storage part
12 control part
121 subject vehicle information acquiring part
122 temporary stop determining part
123 other vehicle information acquiring part
124 other vehicle approach determining part
125 output control part

The invention claimed is:

1. A warning device comprising:
a subject vehicle information acquiring part that acquires a position of a subject vehicle, an azimuth angle of the subject vehicle, and vehicle speed of the subject vehicle;
an other vehicle information acquiring part that acquires a position and an azimuth angle of another vehicle via vehicle-to-vehicle communication;
a temporary stop determining part that determines that the subject vehicle is in a temporary stop state if a state where the vehicle speed of the subject vehicle during traveling is equal to or less than a predetermined speed continues for a predetermined time period or longer;
an other vehicle approach determining part that determines that the other vehicle is approaching the subject vehicle from a side of the subject vehicle, if i) a subject vehicle travel vector starting from the position of the subject vehicle along a direction indicated by the azimuth angle of the subject vehicle and ii) an other vehicle travel vector starting from the position of the other vehicle along a direction indicated by the azimuth angle of the other vehicle intersect with each other, and if the position of the other vehicle is included in a predetermined angle range defined laterally with respect to the azimuth angle of the subject vehicle, while the temporary stop determining part determines that the subject vehicle is in the temporary stop state; and
an output control part that causes a warning output part to output a warning on condition that the subject vehicle in the temporary stop state starts traveling while the other vehicle approach determining part determines that the other vehicle is approaching the subject vehicle,
wherein the other vehicle approach determining part:
does not determine whether or not the other vehicle is approaching the subject vehicle if at least one of detection accuracy of the position of the subject vehicle or detection accuracy of the position of the other vehicle is less than a position accuracy determination threshold, or if at least one of detection accuracy of the azimuth angle of the subject vehicle or detection accuracy of the azimuth angle of the other vehicle is less than an azimuth angle determination threshold, and
determines whether or not the other vehicle is approaching the subject vehicle if the detection accuracy of the position of the subject vehicle and the detection accuracy of the position of the other vehicle are equal to or greater than the position accuracy determination threshold, and if the detection accuracy of the azimuth angle of the subject vehicle and the detection accuracy of the azimuth angle of the other vehicle are equal to or greater than the azimuth angle accuracy determination threshold.

2. A warning device comprising:
a subject vehicle information acquiring part that acquires a position of a subject vehicle, an azimuth angle of the subject vehicle, and vehicle speed of the subject vehicle;
an other vehicle information acquiring part that acquires a position and an azimuth angle of another vehicle via vehicle-to-vehicle communication;
a temporary stop determining part that determines that the subject vehicle is in a temporary stop state if a state where the vehicle speed of the subject vehicle during traveling is equal to or less than a predetermined speed continues for a predetermined time period or longer;
an other vehicle approach determining part that determines that the other vehicle is approaching the subject vehicle from a side of the subject vehicle, if i) a subject vehicle travel vector starting from the position of the subject vehicle along a direction indicated by the azimuth angle of the subject vehicle and if) an other vehicle travel vector starting from the position of the other vehicle along a direction indicated by the azimuth angle of the other vehicle intersect with each other, and if the position of the other vehicle is included in a predetermined angle range defined laterally with respect to the azimuth angle of the subject vehicle, while the temporary stop determining part determines that the subject vehicle is in the temporary stop state; and
an output control part that causes a warning output part to output a warning on condition that the subject vehicle in the temporary stop state starts traveling while the other vehicle approach determining part determines that the other vehicle is approaching the subject vehicle,
wherein
the subject vehicle information acquiring part further acquires information showing an operation position of a shift lever of the subject vehicle and whether a brake of the subject vehicle is on or off, and
the temporary stop determining part determines that the subject vehicle is in the temporary stop state when the operation position of the shift lever has continuously been a drive position from a moment at or before a moment when the vehicle speed of the subject vehicle has become equal to or less than the predetermined speed, if a state where the vehicle speed of the subject vehicle is equal to or less than the predetermined speed continues for the predetermined time period or longer with the brake being on.

3. The warning device according to claim 2, wherein
the subject vehicle information acquiring part further acquires an accelerator opening degree of the subject vehicle, and
the output control part causes the warning to be output, if the accelerator opening degree becomes larger than zero after the brake of the subject vehicle in the temporary stop state has become off while it is determined that the other vehicle is approaching the subject vehicle.

4. A warning device comprising:
a subject vehicle information acquiring part that acquires a position of a subject vehicle, an azimuth angle of the subject vehicle, and vehicle speed of the subject vehicle;
an other vehicle information acquiring part that acquires a position and an azimuth angle of another vehicle via vehicle-to-vehicle communication;
a temporary stop determining part that determines that the subject vehicle is in a temporary stop state if a state where the vehicle speed of the subject vehicle during traveling is equal to or less than a predetermined speed continues for a predetermined time period or longer;
an other vehicle approach determining part that determines that the other vehicle is approaching the subject vehicle from a side of the subject vehicle, if i) a subject vehicle travel vector starting from the position of the subject vehicle along a direction indicated by the azimuth angle of the subject vehicle and ii) an other vehicle travel vector starting from the position of the other vehicle along a direction indicated by the azimuth angle of the other vehicle intersect with each other, and if the position of the other vehicle is included in a predetermined angle range defined laterally with respect to the azimuth angle of the subject vehicle, while the temporary stop determining part determines that the subject vehicle is in the temporary stop state; and
an output control part that causes a warning output part to output a warning on condition that the subject vehicle in the temporary stop state starts traveling while the other vehicle approach determining part determines that the other vehicle is approaching the subject vehicle,
wherein
the other vehicle information acquiring part further acquires a vehicle speed of the other vehicle, and
the other vehicle approach determining part:
generates the subject vehicle travel vector, along the direction indicated by the azimuth angle of the subject vehicle, having a predetermined length from the position of the subject vehicle in the temporary stop state;
generates the other vehicle travel vector, along the direction indicated by the azimuth angle of the other vehicle from the position of the other vehicle during traveling, having a length obtained by multiplying the vehicle speed of the other vehicle by a predetermined time period; and
determines that the other vehicle is approaching the subject vehicle from the side of the subject vehicle if the generated subject vehicle travel vector and the generated other vehicle travel vector intersect with each other, and the position of the other vehicle is included in the predetermined angle range.

5. The warning device according to claim 4, wherein the other vehicle approach determining part:
generates the subject vehicle travel vector along an average of directions indicated by a plurality of azimuth angles of the subject vehicle acquired immediately before; and
generates the other vehicle travel vector along an average of directions indicated by a plurality of azimuth angles of the other vehicle acquired immediately before.

6. The warning device according to claim 1, wherein
the other vehicle approach determining part determines that the other vehicle is approaching the subject vehicle from a right of the subject vehicle if the subject vehicle travel vector and the other vehicle travel vector intersect with each other, and if the position of the other vehicle is included in a right-side angle range of an obtuse angle, which is the predetermined angle range on a right side with respect to the azimuth angle of the subject vehicle while the temporary stop determining part determines that the subject vehicle is in the temporary stop state, and
the other vehicle approach determining part determines that the other vehicle is approaching the subject vehicle from a left of the subject vehicle if the position of the other vehicle is included in the predetermined angle range, which is an obtuse angle on a left side with respect to the azimuth angle of the subject vehicle.

7. The warning device according to claim 1, wherein
the subject vehicle information acquiring part acquires accuracy of the position of the subject vehicle and accuracy of the azimuth angle of the subject vehicle,
the other vehicle information acquiring part acquires accuracy of the position of the other vehicle and accuracy of the azimuth angle of the other vehicle, and
the other vehicle approach determining part determines whether or not the other vehicle is approaching the subject vehicle if the accuracy of the position of the subject vehicle and the accuracy of the position of the other vehicle are equal to or greater than a position accuracy determination threshold, and if the accuracy of the azimuth angle of the subject vehicle and the accuracy of the azimuth angle of the other vehicle are equal to or greater than an azimuth angle accuracy determination threshold.

8. The warning device according to claim 1, wherein
the temporary stop determining part determines that the subject vehicle during traveling came to a temporary stop if a state where the vehicle speed of the subject vehicle is equal to or less than the predetermined speed continues for the predetermined time period or longer, from when the subject vehicle that was traveling at a speed greater than the predetermined speed decelerated to reach a speed equal to or less than the predetermined speed.

* * * * *